(12) United States Patent
Cohen et al.

(10) Patent No.: US 6,487,635 B1
(45) Date of Patent: *Nov. 26, 2002

(54) MANAGEMENT OF ORPHAN TRACKS

(75) Inventors: Aviram Cohen, Lexington, MA (US); Ishai Kedem, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 78 days.

This patent is subject to a terminal disclaimer.

(21) Appl. No.: 09/725,407

(22) Filed: Nov. 29, 2000

(51) Int. Cl.[7] .............................................. G06F 12/00
(52) U.S. Cl. ...................................................... 711/112
(58) Field of Search ......................................... 711/112

(56) References Cited

U.S. PATENT DOCUMENTS

| | | | |
|---|---|---|---|
| 5,335,352 A | * 8/1994 | Yanai et al. | 710/51 |
| 5,381,539 A | 1/1995 | Yanai et al. | 711/133 |
| 5,857,213 A | * 1/1999 | Benhase et al. | 711/112 |
| 6,330,655 B1 | 12/2001 | Vishlitzky et al. | 711/208 |

* cited by examiner

Primary Examiner—David L. Robertson
(74) Attorney, Agent, or Firm—Fish & Richardson P.C.

(57) ABSTRACT

The meta-data pattern for records in an orphan track is not readily compressible into a form suitable for maintaining in memory. A method is provided for periodically attempting to compress meta-data from orphan tracks as newly compressible meta-data patterns are made available. The method includes specifying a compressed representation for a first meta-data pattern and determining a second meta-data pattern formed by the meta-data associated with the orphan track. If the second meta-data pattern is consistent with the first meta-data pattern, a compressed representation of the second meta-data pattern is generated and maintained in memory. In an optional feature, meta-data that could not be compressed is collected and periodically transmitted to a data-analysis node for analysis.

26 Claims, 3 Drawing Sheets

MANAGEMENT OF ORPHAN TRACKS

This invention relates to data-storage systems, and in particular, to reducing the number of orphan tracks on a disk.

BACKGROUND

In a typical data-storage system, the process of retrieving data from a disk in response to a user's request includes several distinct steps. First, the data-storage system identifies the location of the record containing the data sought by the user. Then, the data-storage system sets aside a portion of memory to receive the data. Only then does the data-storage system actually fetch the data itself.

In order to locate the data and set aside a portion of memory to receive it, the data-storage system must know the nature of the data sought by the user without actually having read the data itself. This is achieved by associating with each record a set of meta-data that describes certain characteristics of that record. This meta-data is typically stored on the disk, as part of the data record that it describes. Upon receiving a request from the user, the data-storage system reads this meta-data before reading the actual data.

Because the meta-data is stored on the disk, a request for data requires two separate disk accesses: a first disk access to read the meta-data, followed shortly by a second disk access to read the data itself. Because it requires movement of mechanical parts, each disk access operation introduces considerable delay. It is therefore undesirable to access the disk more often that necessary.

One method for reducing the delay is to eliminate the first read access by storing the meta-data in memory. In a modern data-storage systems, however, the number of records has become so large that it is no longer practical to maintain copies of all meta-data in memory. Doing so would leave little or no memory available for users.

Commonly owned U.S. Pat. No. 6,330,655, entitled Digital Data Storage Subsystem Including Directory for Efficiently Providing Formatting Information for Stored Records teaches a data-storage system in which records are organized into tracks on a disk. To the extent that the records in a track share a common record format, the meta-data for all the records in that track can be represented in a compressed form. This compressed meta-data can then be maintained in memory without severely diminishing the amount of memory available to users. Although the compressed meta-data must still be decompressed into meta-data before it is available for use, the decompression carried out entirely in memory is much faster than retrieval of meta-data directly from a disk.

The foregoing application defines a finite number of format families. Each format family represents a pattern of records on a track. If the records in a track are laid out in a pattern that corresponds to one of these format families, then the meta-data for all records on that track can be reconstructed by storing only the format family for that track and a few additional parameters which vary from one format family to the next.

In practice, most tracks on a disk have records that are laid out in a pattern corresponding to one of the several defined format families. Nevertheless, there exist tracks in which some or all of the records are laid out in a pattern that does not correspond to any known format family. Such tracks are referred to as "orphan tracks."

In an orphan track, the meta-data for at least some of the records on the track is not readily compressible. As a result, the meta-data for those records is consigned to remaining on the disk. Access to those records on the orphan track is thus hampered by the need to perform two separate disk accesses: one to retrieve the meta-data and then another to retrieve the actual data requested by the user. For this reason, it is desirable to reduce the number of orphan tracks and the extent to which those orphan tracks include records whose meta-data patterns cannot be represented in compressed form.

SUMMARY

The invention provides for periodically attempting to compress meta-data for records on an orphan track as new format families are added. If the compression is successful, the compressed representation of the meta-data for that track is maintained in memory. As a result, the orphan track loses its orphancy status and all records on that track become as easily accessible as the records on any other track for which the compressed meta-data is fully available in memory.

The invention includes a method for reducing latency associated with accessing a desired record from an orphan track by specifying a compressed representation for a first meta-data pattern. This first meta-data pattern corresponds to a newly-added format family. A second meta-data pattern, which is associated with the orphan track, is then inspected to see if it is consistent with the first meta-data pattern. If it is, then the orphan track belongs to the newly-added format family. A compressed representation of the second meta-data pattern is then generated and maintained in memory.

When the orphan track is found not to belong to the newly-added format family as defined by the first meta-data pattern, the invention optionally includes saving the meta-data associated with the orphan track in an orphan table in memory. The meta-data saved in the orphan table is then periodically analyzed in an effort to identify new patterns of meta-data formats susceptible to compression.

Analysis of the meta-data collected in the orphan table can take place locally. However, such analysis is more likely to be fruitful when orphan tables from a plurality of data-storage systems is transmitted to a data-analysis node for analysis.

Unless otherwise defined, all technical and scientific terms used herein have the same meaning as commonly understood by one of ordinary skill in the art to which this invention belongs. Although methods similar or equivalent to those described herein can be used in the practice or testing of the present invention, suitable methods are described below. All patent applications and patents mentioned herein are incorporated by reference in their entirety. In case of conflict, the present specification, including definitions, will control. In addition, the examples described herein are illustrative only and not intended to be limiting.

Other features and advantages of the invention will be apparent from the following detailed description and the accompanying figures, in which:

DETAILED DESCRIPTION

Figure 1:
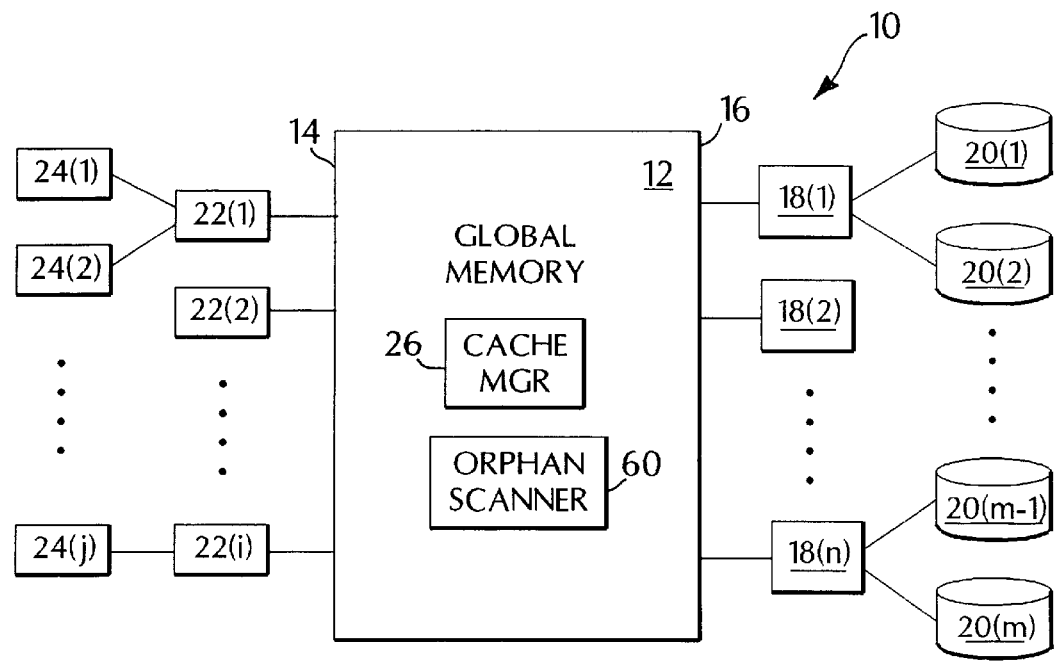
FIG. 1 is a schematic illustration of a data-storage system incorporating the principles of the invention.

FIG. 1 shows a data-storage system 10 for practice of a disk scanning method according to the invention. The data-storage system 10 includes a global cache memory 12 (hereafter referred to as "cache memory") having a front-end 14 and a back end 16. At its back end 16, the cache memory 12 is in data communication with a plurality of device controllers 18(1)–18(n), each of which controls a plurality of mass-storage devices 20(1)–20(m). At its front end 14, the cache memory 12 is in data communication with a plurality of host adaptors 22(1)–22(i), each of which is in communication with a plurality of hosts 24(1)–24(j).

The mass storage devices 20(1)–20(m), the cache memory 12, and the host adaptors 22(1)–22(i) can be local to each other, or they can be remote from each other and connected by a network such as a packet-switched network. The invention described herein does not rely on the manner in which the components of the data-storage system 10 are connected together.

The host adaptors 22(1)–22(i) generate instructions for communicating data between the cache memory 12 and the individual hosts 24(1)–24(j). Similarly, the device controllers 18(1)–18(n) generate instructions for communicating data between the cache memory 12 and the individual mass-storage devices 20(1)–20(m). Both the host adaptors 22(1)–22(i) and the device controllers 18(1)–18(n). are fully described in commonly owned U.S. Pat. No. 5,335,352 entitled "Reconfigurable Multi-Function Disk Controller," which is hereby incorporated by reference.

The mass-storage devices 20(1)–20(m) are typically disk storage devices that include arrays of magnetic disk drives. Accordingly, mass-storage devices will hereafter be referred to as "disks." However, depending on the requirements of the system's users, other mass storage devices such as tape drives or optical disks can be used in place of some or all of the disks.

The cache memory 12 is typically a high-speed semiconductor memory for temporary storage of data that has been read from, or will ultimately be written to, at least one of the disks 20(1)–20(m). The transfer of data into and out of the cache memory 12, and the allocation of cache memory 12 among the disks 20(1)–20(m), is under the control of a cache manager 26. Although shown in FIG. 1 as being resident in cache memory 12, the cache manager 26 is a virtual entity that can be resident elsewhere in the data-storage system 10 or distributed among various components of the data-storage system 10.

The interposition of a cache memory 12 between the disks 20(1)–20(m) and a host 24(1) improves system throughput by largely eliminating the host's lengthy wait for disk access. From the host's point of view, the cache memory 12 appears as a single logical disk with extremely low latency. In reality, the latency has still occurred, but it is borne by the cache manager 26 rather than by the host 24(1). For example, when the host writes data to a disk, the host actually writes that data to a designated location in the cache memory 12. The fact that the cache manager 26 later varies out the time-consuming operation of relaying that data from the cache memory 12 to one or more disks 20(1)–20(m) is kept hidden from the host. When the host reads data from the disk, it actually reads that data from a designated location in the cache memory 12. The fact that the cache manager 26 may have already carried out the time-consuming operation of pre-fetching data from those disks, is invisible to the host 24(1).

Figure 2:
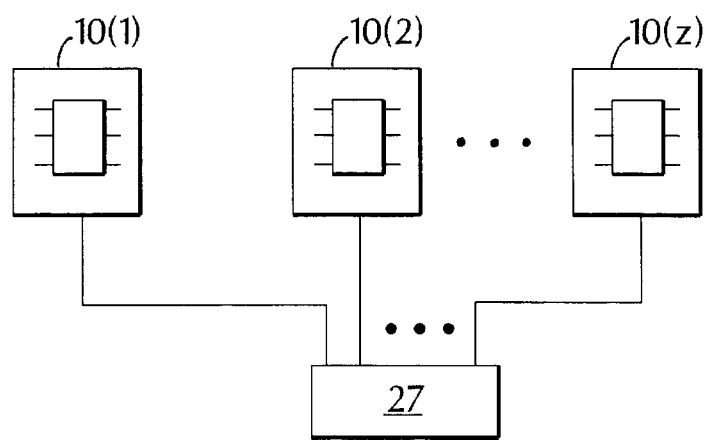
FIG. 2 shows several data-storage systems of the type shown in FIG. 1, all connected to a data-analysis node.

A plurality of data-storage systems 10(1), 10(2)–10(z) of the type described in FIG. 1 can be connected to a data-analysis node 27 as shown in FIG. 2. The data-analysis node 27 provides remote management services to the individual data-storage systems 10(1)–10(z). These services might include providing software updates to the individual data-storage systems 10(1)–10(z). These services can also include collection of statistics associated with usage of the individual data-storage systems 10(1)–10(z). Such statistics are useful because by drawing attention to inefficiencies in system usage or changes in patterns of system usage, they provide an impetus and direction for further software upgrades.

Figure 3:
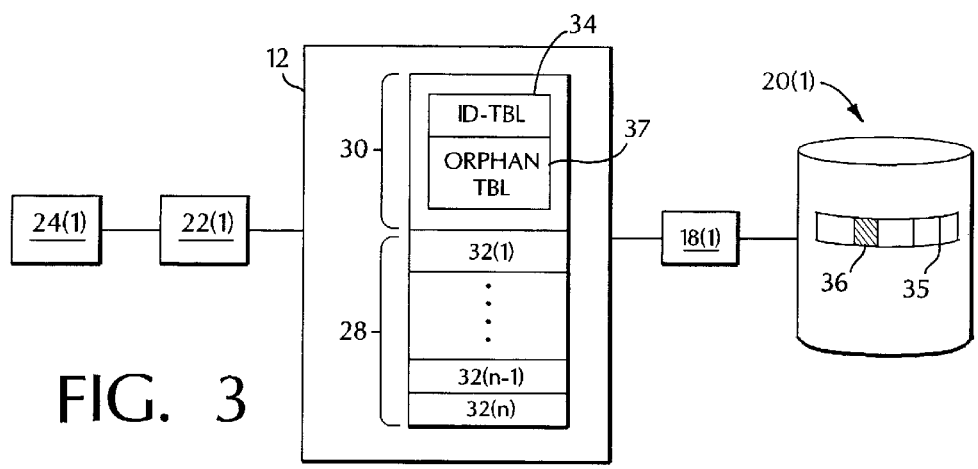
FIG. 3 is a schematic illustration of the architecture of the global cache memory shown in FIG. 1.

As shown in FIG. 3, the cache memory 12 includes a data storage section 28 and a control section 30. The data storage section 28 in turn is divided into a plurality of cache slots 32(1)–32(n), with each cache slot corresponding to one of the device controllers 18(1)–18(n) and representing a track accessible to that device controller. A particular device controller 18(1) accesses only its own corresponding cache slot 32(1) and not the cache slots 32(2)–32(n) associated with other device controllers 18(2)–18(n).

The control section 30 of the cache memory 12 includes an ID-table 34 maintained by the cache manager 26. This ID-table 34 contains information indicative of the contents of each disk 20(1)–20(m). In particular, the ID-table 34 includes, for each track 35 on a disk 20(1), a copy of compressed meta-data from which meta-data corresponding to all records on that track 35 can be derived. The structure of the ID-table 34 is described in U.S. Pat. No. 5,381,539 entitled "System and Method for Dynamically Controlling Cache Management".

For a disk 20 having variable length records, the meta-data for a particular record 36 includes information indicating its logical location as well as its length. This information includes the number of the cylinder and head, which together specify the track 35 on which the record 36 can be found, the record number within the track 35, the key length, and the data-length for that record 36.

Figure 4:
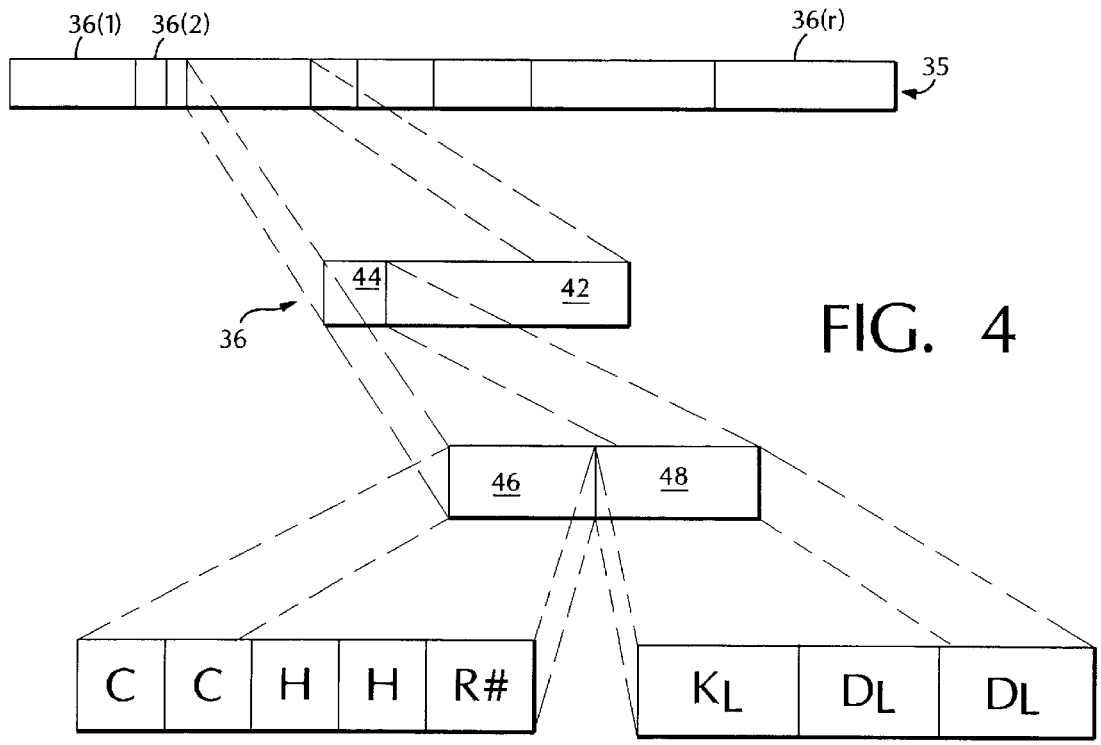
FIG. 4 shows the anatomy of a typical track from the disk shown in FIG. 1.

FIG. 4 shows a typical track 35 stored on the representative disk 20. The track 35 is a fixed length structure that is divided into a plurality of records 36(1)–36(r). For some tracks, these records 36 all have the same length. However, in general, these records 36 have variable lengths that are defined when the disk 20 is first formatted by the host. Since the track 35 is a fixed length structure made up of variable length records 36, it follows that each track 35 can also have a variable number of records 36.

A representative record 36 from the track 35 is divided into a data portion 42 and a meta-data portion 44, sometimes referred to as the "count" for that record. The meta-data portion 44 is itself divided into an address-descriptor 46 and a record-descriptor 48. The address-descriptor 46 includes information describing the location of that record 36 on the disk 20. The record-descriptor 48 contains information that describes characteristics of the data portion 42 of the record 36.

For a typical disk 20, the location-information 46 consists of two bytes specifying the cylinder number of the record 36 and two bytes specifying the head on the cylinder. Together, these four bytes identify the track 35 containing the record 36. The remaining byte in the location-information 46 specifies the record number of the record 36 on the track 35.

The data-information 48 consists of one byte specifying the key length and two bytes specifying how much data is in the data portion 42 of the record 36. The meta-data portion 44 of a record 36 thus contains a total of eight bytes. A track 35, which can include many records 36, thus includes considerable meta-data.

Before the data-storage system 10 can access the data portion 42 of a record 36, it must have access to the meta-data portion 44 of the record 36. To do so, the data-storage system 10 accesses a table of contents for the entire disk 20. This table of contents, which is referred to as a "FAT" in PC drives and as a "VCT" in IBM type drives, is at a known location on the disk 20. From this table of contents, the data-storage system 10 obtains a pointer to the record 36 to be accessed.

Having identified the record 36 to be accessed, the data-storage system 10 then retrieves the count, or meta-data associated with that record 36. Although the meta-data could be retrieved directly from the disk 20 itself, this is a time-consuming operation. Instead, when a new disk is added to the system, or when an existing disk is reformatted, meta-data for the records on the disk is placed in the cache memory 12, where it can be accessed far more quickly. In particular, the meta-data is stored in the ID-table 34.

Although the cache memory 12 is quite large, it is nevertheless finite in its capacity. Any cache memory 12 consumed by meta-data thus reduces the amount of cache memory available to the hosts 24(1)–24(j). As a result, it is desirable to compress the meta-data before storing it in the ID-table 34.

On a typical disk 20, all records 36 on the same track 35 will share the same cylinder and head. Consequently, it is natural to group together all the meta-data for that track 35 and to store the cylinder and head only once for that group. This is an example of compression by exploiting redundancies in the meta-data.

Additional data-compression can also be achieved by exploiting patterns in the meta-data associated with the records 36 of the track 35. For example, if each record 36 on the track 35 has the same key length and the same data-length, there is no need to encode the key-length and data-length more than once. It is more efficient in this case to indicate that the all records 36 on the track 35 have this common meta-data pattern and to then store the common key-length and data-length only once.

Meta-data patterns that are more complex than the foregoing can also be used for the compression of meta-data. For example, a track 35 may consist of records 36 in which all but one of the records 36 have the same data-length. Or, a track 35 may consist of even-numbered records having a first data-length and odd-numbered records having a second data-length. U.S. Pat. No. 6,330,655 describes sixteen different meta-data patterns for records 36 in a track 35 and shows how to describe the salient features of each meta-data pattern in eight bytes.

Figure 5:
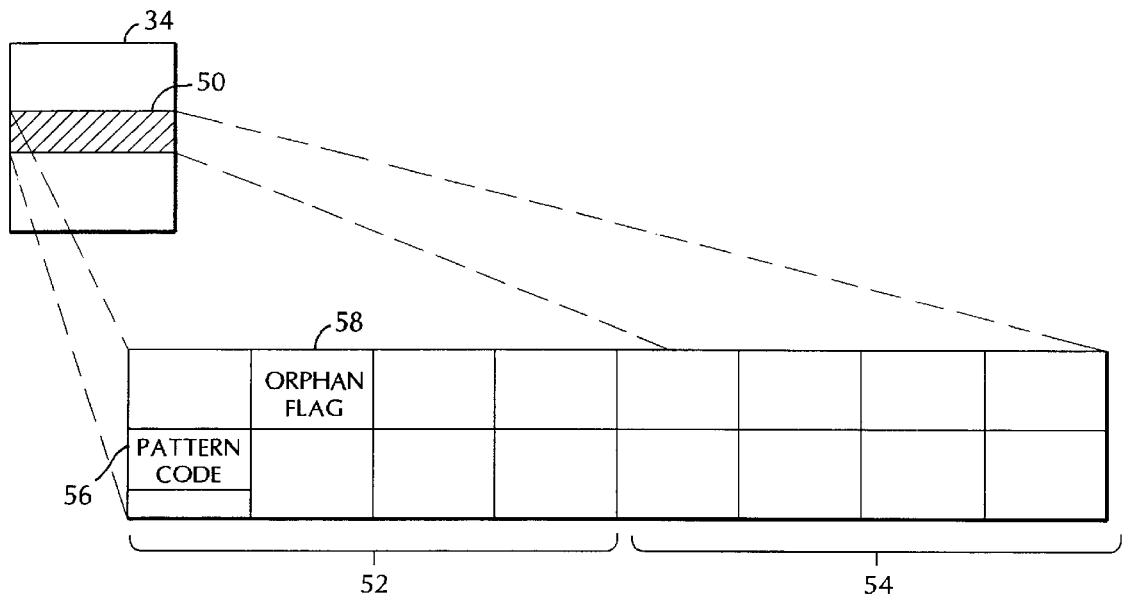
FIG. 5 shows the anatomy of an entry in the ID table of FIG. 3 corresponding to the track of FIG. 4.

FIG. 5 shows the structure of the compressed meta-data 50 from which meta-data for all records on a track 35 can be reconstructed. For each track 35 on each disk 20 in the data-storage system 10, the ID-table contains compressed meta-data like that shown in FIG. 5. Whenever the data-storage system 10 needs the meta-data corresponding to a particular record 36, it retrieves the compressed meta-data for the track 35 containing that record 36 and, in most cases, uses it to reconstruct the meta-data for that record 36.

In the particular embodiment illustrated herein, the compressed meta-data consists of an eight-byte header section 52 and an eight-byte body section 54. The header section 52 includes a one-nibble meta-data pattern code 56 that specifies how the eight bytes in the body section 54 are to be interpreted. For example, if the meta-data pattern code 56 specifies that the records 36 on the track 35 identified by this meta-data have alternating data-lengths, the meaning given to the first byte of the body section 54 would be the number of records in the track 35. The second and third bytes would then be interpreted as the data-lengths for odd-numbered records on that track 35, and the fourth and fifth bytes would be interpreted as the data-lengths for even-numbered records on that track 35.

The sixteen meta-data patterns specified in the above-mentioned U.S. Patent Application include the most common meta-data patterns found in practice. Nevertheless, meta-data patterns other than those already specified do exist. If the records 36 on a track 35 are formatted according to one of these unlisted meta-data patterns, then it will be impossible to compress the meta-data for all the records on that track 35 into the eight bytes available in the body section 54.

A track 35 suffering from this disability is referred to as an "orphan track." An orphan flag 58 in the header 52 of the compressed meta-data for a track indicates whether or not that track 35 is an orphan track. If the orphan flag 58 indicates that the track 35 is not an orphan track, then the data-storage system 10 reconstructs the key length and the data-length for all records 36 on that track 35 by using the eight bytes in the body section 54. However, if the orphan flag 58 indicates that the track 35 is an orphan track, then that track includes records for which the meta-data describing the key length and data-length cannot be reconstructed from the eight bytes available in the body section 54 of the compressed meta-data for the track 35. Instead, the meta-data for those records must be retrieved directly from the disk 20.

There is, however, nothing inherent in the pattern of records 36 in an orphan track that condemns it to permanent orphancy. One reason for having classified a track 35 as an orphan track may simply be that no suitable compressed representation for the track's meta-data pattern of the offending records on that track had been invented as of the time the classification was made. This reason does not preclude the invention of a suitable compressed representation of the meta-data for those records after the track 35 has been classified as an orphan track.

Another reason that a track 35 may have been classified as an orphan track is that at the time the classification was made, the meta-data pattern for that track 35 was only rarely observed in practice. Because of its rarity, the performance benefit of providing a compressed representation for that meta-data pattern may have been deemed inadequate. However, this too can change. A once rare meta-data pattern may become increasingly common as the nature of data to be stored changes over time.

To facilitate the analysis of meta-data patterns that could not be compressed, the cache memory 12 also includes an orphan table 37 for storage of those meta-data patterns. The meta-data patterns in the orphan table 37 can be analyzed in an effort to identify and stay abreast of trends in track formatting and in an effort to derive additional compressed representations of meta-data patterns. This analysis can be performed locally. However, it is generally more effective for orphan tables from a plurality of data-storage systems to be collected at the data-analysis node 27 for analysis.

In either one of the above cases, once incompressible meta-data may become compressible as a result of developments made at the data-analysis node 27. When such developments occur, the data-analysis node 27 sends a specification of the now compressible meta-data pattern, together with its compressed representation, to one or more data-storage systems 10(1)–10(z) to which it is connected. The data-analysis node 27 can then instruct those data-storage systems 10(1)–10(z) to execute an orphan scanner 60 to see if the newly-developed specification will eliminate any existing orphan tracks.

Figure 6:
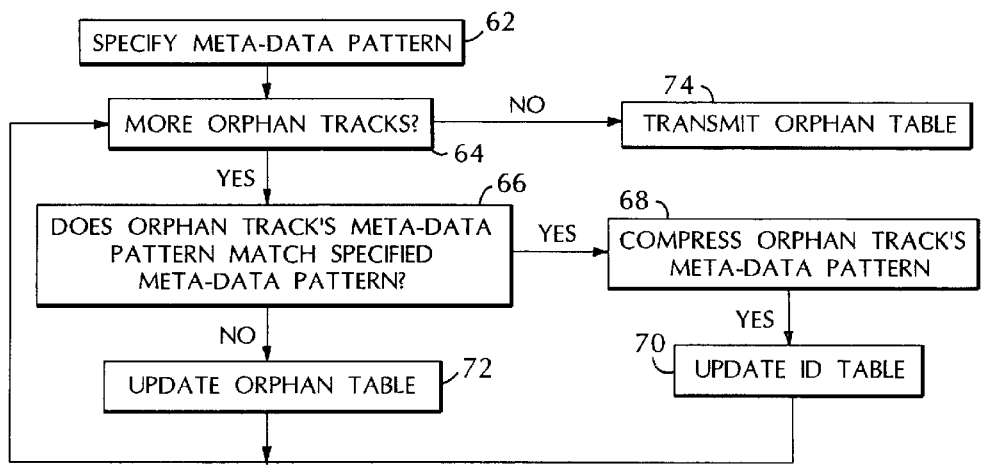
FIG. 6 is a flow chart of an orphan scanning method.

As shown in FIG. 6, the process of possibly reclassifying an orphan track begins with the receipt 62 of the specification at a particular data-storage system. The orphan scanner then scans 64 the disks associated with that data-storage system for the presence of any orphan tracks. If the orphan scanner identifies an orphan track, it attempts to match 66 the meta-data pattern for that orphan track with the newly-compressible meta-data pattern. If the match is successful, the orphan scanner compresses 68 the meta-data for that track in accord with the specification. The orphan scanner then updates 70 the orphan track's entry in the ID table by placing this compressed representation into the body section and updating the meta-data pattern code. As a result of these two operations, the meta-data for the records on the orphan track will become reconstructible from the contents of the body section. The orphan scanner then sets the orphan flag to signal the data-storage system to reconstruct the meta-data for all records on that track from the body section rather than by reading the meta-data directly from the disk. The net effect of these three operations is the reclassification of an orphan track into a regular track.

There will inevitably be cases where the orphan scanner fails to match the newly specified meta-data pattern with the meta-data pattern it finds on the orphan track. When this occurs, the orphan scanner can simply proceed to the next orphan track. However, in an optional feature of the invention, the orphan scanner conducts an orphan census by maintaining an orphan table. The orphan table lists those orphan track meta-data patterns that the orphan scanner could not compress using the newly specified meta-data pattern together with its accompanying compressed representation. In addition, the orphan table includes counters to keep track of how many times each of these incompressible meta-data patterns has occurred.

In the foregoing implementation, if the orphan scanner is unsuccessful in compressing the meta-data pattern for an orphan track, it updates 72 the orphan table. It does so either by updating a counter for an existing entry in the table, or by creating an entirely new entry and setting its counter equal to one. At the end of the orphan scanning process, the orphan table is transmitted 74 to the data-analysis node (see FIG. 2) for analysis.

There may be variations in the foregoing procedure. For example, the data-analysis node 27 may provide more than one meta-data pattern specification at one time. When this is the case, it may be more efficient for the orphan scanner 60 to perform one disk scan in which it attempts compression of orphan tracks using each of the new specifications. Because of the latencies associated with disk access, this variation may be preferable to repeatedly scanning the disk 20 for each of the new specifications.

In the following claims, the terms "track" and "record" are used because existing disks are made up of tracks, each of which contains one or more records. However, as used therein, these terms have the more abstract meaning of two levels of a hierarchy for storage of data, with the higher level ("track") being a grouping of one or more constituent data elements ("records").

It is to be understood that while the invention has been described in conjunction with the detailed description thereof, the foregoing description is intended to illustrate and not to limit the scope of the invention, which is defined by the scope of the appended claims. Other aspects, advantages, and modifications are within the scope of the following claims.

Having described the invention, and a preferred embodiment thereof, what we claim as new and secured by Letters Patent is:

1. A method for reducing latency associated with accessing a desired record from an orphan track on a mass-storage device, said orphan track including a plurality of records, each having associated meta-data, said method comprising:
   specifying a compressed representation for a first meta-data pattern;
   determining a second meta-data pattern formed by said meta-data associated with said plurality of records of said orphan track; and
   if said second meta-data pattern is consistent with said first meta-data pattern,
      generating a compressed representation of said second meta-data pattern, and
      maintaining a copy of said compressed representation in a memory element.

2. The method of claim 1 further comprising updating an orphan table when said second meta-data pattern is inconsistent with said first meta-data pattern.

3. The method of claim 2 wherein updating said orphan table comprises adding to said orphan table an entry indicative of said second meta-data pattern.

4. The method of claim 2 wherein updating said orphan table comprises updating an entry in said orphan table to indicate an occurrence of said second meta-data pattern.

5. The method of claim 1 further comprising maintaining an orphan table of meta-data in memory and analyzing entries of said orphan table to identify meta-data patterns susceptible to compression.

6. The method of claim 5 wherein analyzing entries of said orphan table comprises transmitting entries of said table to a data-analysis node.

7. The method of claim 6 wherein analyzing entries further comprises receiving at said data-analysis node entries from a plurality of orphan tables maintained by a plurality of disk storage systems in communication with said data-analysis node.

8. The method of claim 1 wherein specifying a compressed representation comprises collecting meta-data from a plurality of orphan tables and analyzing said collected meta-data to identify new meta-data patterns susceptible to compression.

9. The method of claim 8 wherein collecting meta-data from a plurality of orphan tables comprises receiving, at a data-analysis node, meta-data collected from a plurality of mass-storage devices.

10. The method of claim 1 further comprising selecting said meta-data to include information indicative of a location of said desired record.

11. A data-storage system comprising:
   a mass-storage device having an orphan track with records formatted according to a first meta-data pattern;
   a memory element having a first table for storage of compressed representations of meta-data patterns for tracks on said mass-storage device; and
   an orphan-scanning process for generating a compressed representation of said first meta-data pattern and incorporating said compressed representation into said first table.

12. The data-storage system of claim 11 wherein said memory element further comprises a second table for storage of said first meta-data pattern when said orphan-scanning process is unable to generate said compressed representation of said first meta-data pattern.

13. The data-storage system of claim 12 further comprising a meta-data analysis process for processing said second table to derive a compressed representation of said first meta-data pattern on the basis of at least one second table.

14. A method for reducing the number of orphan tracks on a mass-storage device, said method comprising:

identifying an orphan track on said mass-storage device, said orphan track having a plurality of records formatted according to a first meta-data pattern;

attempting to generate a compressed representation of said first meta-data pattern; and if said attempt is successful, incorporating said compressed representation of said first meta-data pattern into a memory element for storage of meta-data patterns associated with each track on said mass-storage device.

15. The method of claim 14 further comprising the determining whether said first meta-data pattern is presently incompressible and, if said first meta-data pattern is presently incompressible, storing said first meta-data pattern in an orphan table for subsequent analysis.

16. The method of claim 15 further comprising transmitting said orphan table to a data-analysis node for analysis of meta-data patterns stored in said orphan table.

17. The method of claim 16 further comprising receiving, at said data-analysis node, a first plurality of output tables from a second plurality of disk storage systems.

18. The method of claim 14 further comprising receiving instructions for compressing said first meta-data pattern.

19. The method of claim 14 wherein incorporating said compressed representation comprises setting a flag to indicate that said compressed representation of said first meta-data is incorporated into said memory element.

20. A computer-readable medium having encoded thereon software for reducing the number of orphan tracks on a mass-storage device, said software comprising instructions for:

identifying an orphan track on said mass-storage device, said orphan track having a plurality of records formatted according to a first meta-data pattern;

attempting to generate a compressed representation of said first meta-data pattern; and if said attempt is successful, incorporating said compressed representation of said first meta-data pattern into a memory element for storage of meta-data patterns associated with each track on said mass-storage device.

21. The computer-readable medium of claim 20 wherein said software further comprises instructions for determining whether said first meta-data pattern is presently incompressible and, if said first meta-data pattern is presently incompressible, storing said first meta-data pattern in an orphan table for subsequent analysis.

22. The computer-readable medium of claim 21 wherein said software further comprises instructions for transmitting said orphan table to a data-analysis node for analysis of meta-data patterns stored in said orphan table.

23. The computer-readable medium of claim 20 wherein said software further comprises instructions for receiving instructions for compressing said first meta-data pattern.

24. A data-storage system comprising:

a mass-storage device having an orphan track with records formatted according to a first meta-data pattern;

a memory element for storage of a table of meta-data patterns obtained from orphan tracks on said mass-storage device; and an orphan-scanning process for retrieving said first meta-data pattern and storing said first meta-data pattern in said table.

25. The data-storage system of claim 24 further comprising a data-analysis node for receiving said table of meta-data patterns.

26. The data-storage system of claim 25 wherein said data-analysis node comprises a meta-data analysis process for analysis of meta-data patterns contained in said table.

* * * * *